ated State

Vuijk

[11] 3,802,765
[45] Apr. 9, 1974

[54] HIGH APERTURE OBJECTIVE OF THE EXTENDED GAUSS-TYPE

[75] Inventor: Pieter Vuijk, Naaldwijk, Netherlands

[73] Assignee: N.V. Optische Industrie "De Oude Delft" Van Miereveltlaan, Delft, Netherlands

[22] Filed: Dec. 8, 1972

[21] Appl. No.: 313,330

[30] Foreign Application Priority Data
Jan. 31, 1972 Netherlands............... 7201267

[52] U.S. Cl. ............................ 350/215, 350/176
[51] Int. Cl. ............................ G02b 9/62
[58] Field of Search .......... 350/214, 215, 176, 177,
350/218

[56] References Cited
UNITED STATES PATENTS
3,504,961  4/1970  Hoogland et al. ........... 350/215 X
3,357,776  12/1967  Becker ........................ 350/218 X
3,472,576  10/1969  Wagner ....................... 350/176

*Primary Examiner*—John K. Corbin
*Attorney, Agent, or Firm*—Arthur B. Colvin

[57] ABSTRACT

High aperture objective of the extended Gauss-type, made up of six components, having a relative aperture of at least $f/1$ and an angular field of $2\omega$ of at least 40°.

4 Claims, 10 Drawing Figures

HIGH APERTURE OBJECTIVE OF THE EXTENDED GAUSS-TYPE

The invention relates to a high aperture objective of the extended Gauss-type, with a relative aperture of at least $f/1$ and an angular field of $2\omega$ of at least 40°, which, taken in the order from the long conjugate towards the short conjugate of the objective, consists of a first ($L_1$) and a second ($L_2$) component, which components each consist of a single meniscus lens of positive power turned with its concave side to the diaphragm, a third ($L_3$ and $L_4$) and a fourth ($L_5$ and $L_6$) component, which components each consist of a divergent cemented doublet meniscus component each turned with its concave side to a diaphgram, which is placed between the third and fourth components and a fifth ($L_5$) component, which component consists of a lens of positive power.

Objectives of this type have been described in the Dutch Pat. specification No. 121,686. This objective has a relative aperture of $f/0.95$ and is well corrected in an angular field of 40°. It appears that the state of correction of an objective of this type can no further be improved if the relative aperture is increased. In particular the astigmatism can not be suppressed sufficiently.

The object of the invention is to provide an objective with an improved relative aperture and a good state of correction in an angular field of at least 40°.

The object according to the invention is characterized by a sixth ($L_8$, $L_9$ and $L_{10}$) component which component is placed behind the fifth component and is made up of a divergent meniscus component of small power and of which the convex side is turned towards the diaphragm, the thickness of this component being larger than $0.3f$, and by the following conditions in combination:

$$n_3 > 1.75$$
$$n_3 > n_4$$
$$n_6 > 1.75$$
$$n_7 > 1.75$$

in which $n_{subscript}$ is the refractive index for the d-line of the spectrum of the lenses in the order indicated above.

The conditions indicated above while allowing to increase considerably the relative aperture of the objective, appear to be especially effective to provide a good state of correction, whereas the first condition has a particularly favorable influence on the correction of astigmatism.

In the embodiments, which will be described hereafter, the sixth component is made up of three lenses ($L_8$, $L_9$ and $L_{10}$). It is, however, noted that, dependent on the spectrum, which is used and/or the state of correction required, this number may be one or two.

Figure 1:
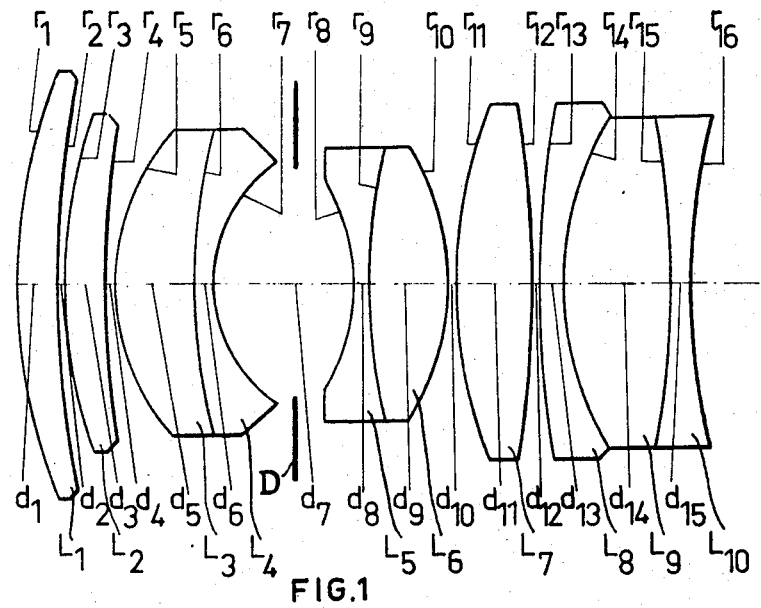
FIG. 1 illustrates the three embodiments of the objective according to the invention.
Figure 2:
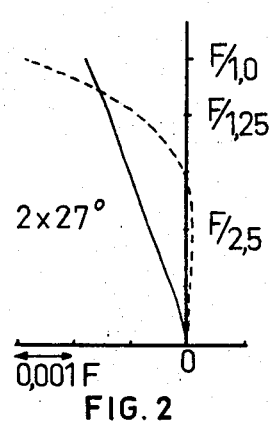
FIGS. 2–4 show the spherical aberration and the unsatisfied amount of the sine condition, the astigmatism and the distortion, respectively for a first embodiment with a relative aperture of $f/1$ and an angular field of 54°.
Figure 3:
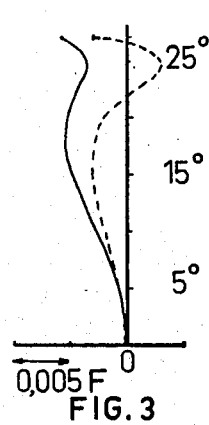
Figure 4:
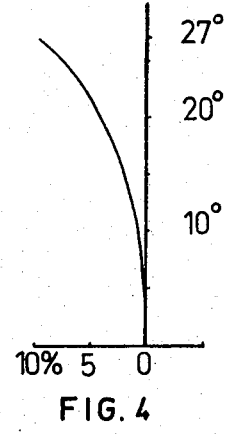
Figure 5:
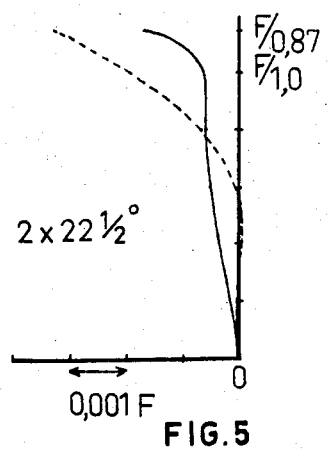
FIGS. 5–7 show the corresponding aberrations for a second embodiment with a relative aperture of $f/0.87$ and an angular field of 45°.
Figure 6:
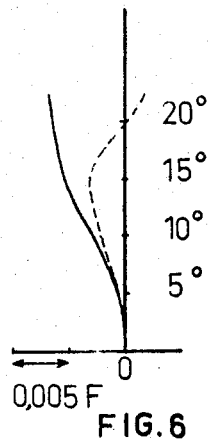
Figure 7:
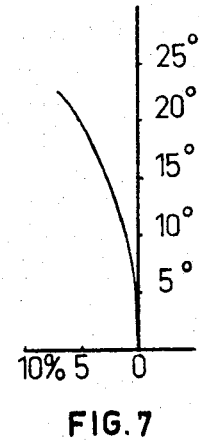
Figure 8:
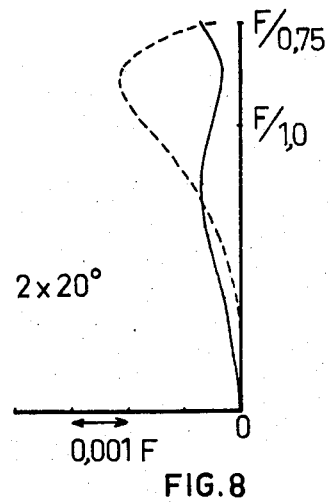
FIGS. 8–10 show the corresponding aberrations for a third embodiment with a relative aperture of $f/0.75$ and an angular field of 40°.
Figure 9:
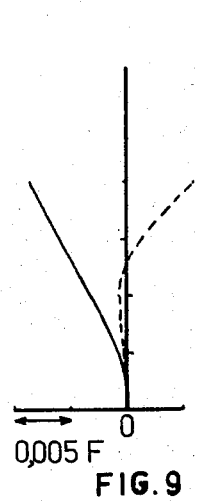
Figure 10:
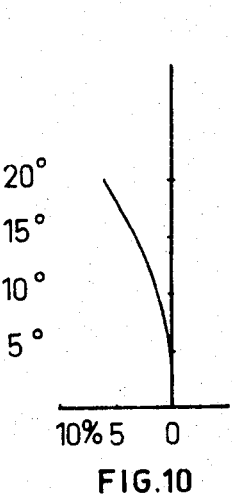

The data of the three embodiments are given in the Tables I, II and III. In these tables the lenses are indicated as $L_{subscript}$ and the diaphgram with D.

TABLE I $f = 1.0$     $f/1.0$     field 54°

| | radius of curvature $r$ | lens thickness or distance $d$ | refractive index $n_d$ | Abbe number $\nu$ |
|---|---|---|---|---|
| $L_1$ | $r_1 = +1.6277$ | $d_1 = 0.1035$ | $n_1 = 1.7130$ | $\nu_1 = 53.8$ |
| | $r_2 = +3.1014$ | $d_2 = 0.0054$ | | |
| $L_2$ | $r_3 = +1.2825$ | $d_3 = 0.0951$ | $n_2 = 1.7130$ | $\nu_2 = 53.8$ |
| | $r_4 = +2.5588$ | $d_4 = 0.0106$ | | |
| $L_3$ | $r_5 = +0.5583$ | $d_5 = 0.1939$ | $n_3 = 1.7883$ | $\nu_3 = 47.4$ |
| $L_4$ | $r_6 = +1.4844$ | $d_6 = 0.0413$ | $n_4 = 1.6885$ | $\nu_4 = 30.6$ |
| D | $r_7 = +0.3603$ | $d_7 = 0.3474$ | | |
| $L_5$ | $r_8 = -0.4916$ | $d_8 = 0.0443$ | $n_5 = 1.6990$ | $\nu_5 = 30.1$ |
| $L_6$ | $r_9 = +1.4506$ | $d_9 = 0.2009$ | $n_6 = 1.7883$ | $\nu_6 = 47.4$ |
| | $r_{10} = -0.6609$ | $d_{10} = 0.0049$ | | |
| $L_7$ | $r_{11} = +1.177$ | $d_{11} = 0.2055$ | $n_7 = 1.7883$ | $\nu_7 = 47.4$ |
| | $r_{12} = -3.3233$ | $d_{12} = 0.0049$ | | |
| $L_8$ | $r_{13} = +3.2477$ | $d_{13} = 0.0641$ | $n_8 = 1.5488$ | $\nu_8 = 45.4$ |
| $L_9$ | $r_{14} = +0.8064$ | $d_{14} = 0.2719$ | $n_9 = 1.7883$ | $\nu_9 = 47.4$ |
| $L_{10}$ | $r_{15} = -2.1956$ | $d_{15} = 0.0493$ | $n_{10} = 1.7847$ | $\nu_{10} = 25.8$ |
| | $r_{16} = +1.7441$ | | | |

TABLE II $f = 1.0$     $f/0.87$     field 45°

| | radius of curvature $r$ | lens thickness or distance $d$ | refractive index $n_d$ | Abbe number $\nu$ |
|---|---|---|---|---|
| $L_1$ | $r_1 = +1.9217$ | $d_1 = 0.0996$ | $n_1 = 1.7130$ | $\nu_1 = 53.8$ |
| | $r_2 = +4.0162$ | $d_2 = 0.0052$ | | |
| $L_2$ | $r_3 = +1.0301$ | $d_3 = 0.1310$ | $n_2 = 1.7130$ | $\nu_2 = 53.8$ |
| | $r_4 = +2.0173$ | $d_4 = 0.0052$ | | |
| $L_3$ | $r_5 = +0.6367$ | $d_5 = 0.2073$ | $n_3 = 1.8028$ | $\nu_3 = 46.8$ |
| $L_4$ | $r_6 = +1.5787$ | $d_6 = 0.0445$ | $n_4 = 1.6885$ | $\nu_4 = 30.6$ |
| D | $r_7 = +0.3825$ | $d_7 = 0.3694$ | | |
| $L_5$ | $r_8 = -0.5306$ | $d_8 = 0.0472$ | $n_5 = 1.6990$ | $\nu_5 = 30.1$ |
| $L_6$ | $r_9 = +1.5428$ | $d_9 = 0.2145$ | $n_6 = 1.8028$ | $\nu_6 = 46.8$ |
| | $r_{10} = -0.7233$ | $d_{10} = 0.0052$ | | |
| $L_7$ | $r_{11} = +1.0657$ | $d_{11} = 0.2186$ | $n_7 = 1.7885$ | $\nu_7 = 50.5$ |
| | $r_{12} = -3.4390$ | $d_{12} = 0.0052$ | | |
| $L_8$ | $r_{13} = +2.9298$ | $d_{13} = 0.0681$ | $n_8 = 1.5488$ | $\nu_8 = 45.4$ |
| $L_9$ | $r_{14} = +0.7651$ | $d_{14} = 0.2886$ | $n_9 = 1.7844$ | $\nu_9 = 43.9$ |
| $L_{10}$ | $r_{15} = -2.0812$ | $d_{15} = 0.0524$ | $n_{10} = 1.7847$ | $\nu_{10} = 25.8$ |
| | $r_{16} = +1.4398$ | | | |

TABLE III $f = 1.0$     $f/0.75$     field 40°

| radius of curvature $r$ | lens thickness or distance $d$ | refractive index $n_d$ | Abbe number $\nu$ |
|---|---|---|---|

| | | |
|---|---|---|
| L₁ | $r_1 = +1.6359$ | |
| | $d_1 = 0.1512$ | $n_1 = 1.6405\ \nu_1 = 60.1$ |
| | $r_2 = +4.4159$ | |
| | $d_2 = 0.0056$ | |
| | $r_3 = +1.2091$ | |
| L₂ | $d_3 = 0.1456$ | $n_2 = 1.6405\ \nu_2 = 60.1$ |
| | $r_4 = +2.3669$ | |
| | $d_4 = 0.0056$ | |
| | $r_5 = +0.6978$ | |
| L₃ | $d_5 = 0.2331$ | $n_3 = 1.8028\ \nu_3 = 46.8$ |
| | $r_6 = +1.6877$ | |
| L₄ | $d_6 = 0.0350$ | $n_4 = 1.6885\ \nu_4 = 30.6$ |
| | $r_7 = +0.4311$ | |
| D | $d_7 = 0.4123$ | |
| | $r_8 = -0.5911$ | |
| L₅ | $d_8 = 0.0364$ | $n_5 = 1.6990\ \nu_5 = 30.1$ |
| | $r_9 = +1.4037$ | |
| L₆ | $d_9 = 0.2412$ | $n_6 = 1.8028\ \nu_6 = 46.8$ |
| | $r_{10} = -0.8500$ | |
| | $d_{10} = 0.0056$ | |
| | $r_{11} = +1.0157$ | |
| L₇ | $d_{11} = 0.2748$ | $n_7 = 1.7885\ \nu_7 = 50.5$ |
| | $r_{12} = -3.9562$ | |
| | $d_{12} = 0.0056$ | |
| | $r_{13} = +1.3406$ | |
| L₈ | $d_{13} = 0.0728$ | $n_8 = 1.5234\ \nu_8 = 51.5$ |
| | $r_{14} = +0.7714$ | |
| L₉ | $d_{14} = 0.2913$ | $n_9 = 1.7883\ \nu_9 = 47.4$ |
| | $r_{15} = -0.9938$ | |
| L₁₀ | $d_{15} = 0.0532$ | $n_{10} = 1.7847\ \nu_{10} = 25.8$ |
| | $r_{16} = +0.9938$ | |

What I claim is:

1. High aperture objective of the extended Gauss-type with a relative aperture of at least $f/1$ and an angular field of $2\omega$ of at least 40°, which, taken in the order from the long conjugate towards the short conjugate of the objective, consists of a first ($L_1$) and a second ($L_2$) component, which components each consist of a single meniscus lens of positive power turned with its concave side to the diaphragm, a third ($L_3$ and $L_4$) and a fourth ($L_5$ and $L_6$) component, which components each consist of a divergent cemented doublet meniscus component, each turned with its concave side to a diaphgram which is placed between the third and fourth components and a fifth ($L_7$) component, which component consists of a lens of positive power, characterized by a sixth divergent meniscus component ($L_8$, $L_9$, $L_{10}$) of small power which is placed behind the fifth component and of which the convex side is turned toward the diaphragm, said sixth component consisting of a first divergent meniscus lens ($L_8$), a second lens ($L_9$) of positive power and a third divergent biconcave lens ($L_{10}$), the thickness of the sixth component being greater than 0.3f, and by the following conditions $n_3 > 1.75$
$n_3 > n_4$
$n_6 > 1.75$
$n_7 > 1.75$ in which $n_{subscript}$ is the refractive index for the d-line of the spectrum of the lenses in the order indicated above.

2. High aperture objective according to claim 1, characterized by the following numeral data:

$f = 1.0$      $f/1.0$      field 54°

| | radius of curvature r | lens thickness or distance d | refractive index $n_d$ | Abbe number $\nu$ |
|---|---|---|---|---|
| L₁ | $r_1 = +1.6277$ | $d_1 = 0.1035$ | $n_1 = 1.7130$ | $\nu_1 = 53.8$ |
| | $r_2 = +3.1014$ | $d_2 = 0.0054$ | | |
| L₂ | $r_3 = +1.2825$ | $d_3 = 0.0951$ | $n_2 = 1.7130$ | $\nu_2 = 53.8$ |
| | $r_4 = +2.5588$ | $d_4 = 0.0106$ | | |
| L₃ | $r_5 = +0.5583$ | $d_5 = 0.1939$ | $n_3 = 1.7883$ | $\nu_3 = 47.4$ |
| | $r_6 = +1.4844$ | | | |
| L₄ | $d_6 = 0.0413$ | | $n_4 = 1.6885$ | $\nu_4 = 30.6$ |
| | $r_7 = +0.3603$ | $d_7 = 0.3474$ | | |
| D | $r_8 = -0.4916$ | | | |
| L₅ | $d_8 = 0.0443$ | | $n_5 = 1.6990$ | $\nu_5 = 30.1$ |
| | $r_9 = +1.4506$ | | | |
| L₆ | $d_9 = 0.2009$ | | $n_6 = 1.7883\ \nu_6 = 47.4$ | |
| | $r_{10} = -0.6609$ | $d_{10} = 0.0049$ | | |
| | $r_{11} = +1.1770$ | | | |
| L₇ | $d_{11} = 0.2055$ | | $n_7 = 1.7883$ | $\nu_7 = 47.4$ |
| | $r_{12} = -3.3233$ | $d_{12} = 0.0049$ | | |
| | $r_{13} = +3.2477$ | | | |
| L₈ | $d_{13} = 0.0641$ | | $n_8 = 1.5488$ | $\nu_8 = 45.4$ |
| | $r_{14} = +0.8064$ | | | |
| L₉ | $d_{14} = 0.2719$ | | $n_9 = 1.7883$ | $\nu_9 = 47.4$ |
| | $r_{15} = -2.1956$ | | | |
| L₁₀ | $d_{15} = 0.0493$ | | $n_{10} = 1.7847$ | $\nu_{10} = 25.8$ |
| | $r_{16} = +1.7441$ | | | |

3. High aperture objective according to claim 1, characterized by the following numeral data:

$f = 1.0$      $f/0.87$      field 45°

| | radius of curvature r | lens thickness or distance d | refractive index $n_d$ | Abbe number $\nu$ |
|---|---|---|---|---|
| L₁ | $r_1 = +1.9217$ | $d_1 = 0.0996$ | $n_1 = 1.1730$ | $\nu_1 = 53.8$ |
| | $r_2 = +4.0162$ | $d_2 = 0.0052$ | | |
| L₂ | $r_3 = +1.0301$ | $d_3 = 0.1310$ | $n_2 = 1.7130$ | $\nu_2 = 53.8$ |
| | $r_4 = +2.0173$ | $d_4 = 0.0052$ | | |
| L₃ | $r_5 = +0.6367$ | $d_5 = 0.2073$ | $n_3 = 1.8028$ | $\nu_3 = 46.8$ |
| | $r_6 = +1.5787$ | | | |
| L₄ | $d_6 = 0.0445$ | | $n_4 = 1.6885$ | $\nu_4 = 30.6$ |
| | $r_7 = +0.3825$ | | | |
| D | $d_7 = 0.3694$ | | | |
| | $r_8 = -0.5306$ | | | |
| L₅ | $d_8 = 0.0472$ | | $n_5 = 1.6990$ | $\nu_5 = 30.1$ |
| | $r_9 = +1.5428$ | | | |
| L₆ | $d_9 = 0.2145$ | | $n_6 = 1.8028$ | $\nu_6 = 46.8$ |
| | $r_{10} = -0.7233$ | $d_{10} = 0.0052$ | | |
| | $r_{11} = +1.0657$ | | | |
| L₇ | $d_{11} = 0.2186$ | | $n_7 = 1.7885$ | $\nu_7 = 50.5$ |
| | $r_{12} = -3.4390$ | $d_{12} = 0.0052$ | | |
| | $r_{13} = +2.9298$ | | | |
| L₈ | $d_{13} = 0.0681$ | | $n_8 = 1.5488$ | $\nu_8 = 45.4$ |
| | $r_{14} = +0.7651$ | | | |
| L₉ | $d_{14} = 0.2886$ | | $n_9 = 1.7844$ | $\nu_9 = 43.9$ |
| | $r_{15} = -2.812$ | | | |
| L₁₀ | $d_{15} = 0.0524$ | | $n_{10} = 1.7847$ | $\nu_{10} = 25.8$ |
| | $r_{16} = -1.4398$ | | | |

4. High aperture objective according to claim 1, characterized by the following numeral data:

$f = 1.0$      $f/0.75$      field 40°

| | radius of curvature r | lens thickness or distance d | refractive index $n_d$ | Abbe number $\nu$ |
|---|---|---|---|---|
| L₁ | $r_1 = +1.6359$ | $d_1 = 0.1512$ | $n_1 = 1.6405$ | $\nu_1 = 60.1$ |
| | $r_2 = +4.4159$ | $d_2 = 0.0056$ | | |
| L₂ | $r_3 = +1.2091$ | $d_3 = 0.1456$ | $n_2 = 1.6405$ | $\nu_2 = 60.1$ |
| | $r_4 = +2.3669$ | $d_4 = 0.0056$ | | |
| L₃ | $r_5 = +0.6978$ | $d_5 = 0.2331$ | $n_3 = 1.8028$ | $\nu_3 = 46.8$ |
| | $r_6 = +1.6877$ | | | |
| L₄ | $d_6 = 0.0350$ | | $n_4 = 1.6885$ | $\nu_4 = 30.6$ |
| | $r_7 = +0.4311$ | | | |
| D | $d_7 = 0.4123$ | | | |
| | $r_8 = -0.5911$ | | | |
| L₅ | $d_8 = 0.0364$ | | $n_5 = 1.6990$ | $\nu_5 = 30.1$ |
| | $r_9 = +1.4037$ | | | |
| L₆ | $d_9 = 0.2412$ | | $n_6 = 1.8028$ | $\nu_6 = 46.8$ |
| | $r_{10} = -0.8500$ | $d_{10} = 0.0056$ | | |
| | $r_{11} = +1.0157$ | | | |
| L₇ | $d_{11} = 0.2748$ | | $n_7 = 1.7885$ | $\nu_7 = 50.5$ |
| | $r_{12} = -3.9562$ | $d_{12} = 0.0056$ | | |

| | $r_{13} = +1.3406$ | | |
|---|---|---|---|
| L$_8$ | | $d_{13} = 0.0728$ | $n_8 = 1.5234\ \nu_8 = 51.5$ |
| | $r_{14} = +0.7714$ | | |
| L$_9$ | | $d_{14} = 0.2913$ | $n_9 = 1.7883\ \nu_9 = 47.4$ |
| | $r_{15} = -0.9938$ | | |
| L$_{10}$ | | $d_{15} = 0.0532$ | $n_{10} = 1.7847\ \nu_{10} = 25.8$ |

$r_{16} = +0.9938$

* * * * *